United States Patent [19]

Kawano

[11] Patent Number: 5,059,005
[45] Date of Patent: Oct. 22, 1991

[54] OBJECTIVE LENS SYSTEM FOR MICROSCOPES

[75] Inventor: Yoshihiro Kawano, Tokyo, Japan

[73] Assignee: Olympus Optical Co., Ltd., Tokyo, Japan

[21] Appl. No.: 571,407

[22] Filed: Aug. 23, 1990

[30] Foreign Application Priority Data

Aug. 24, 1989 [JP] Japan .................................. 1-216141

[51] Int. Cl.⁵ .......................................... G02B 3/00
[52] U.S. Cl. .................................... 359/654; 359/661
[58] Field of Search ........................................ 350/413

[56] References Cited

U.S. PATENT DOCUMENTS 4,883,346  11/1989  Aoki et al. ......................... 350/413

FOREIGN PATENT DOCUMENTS

| 60-159817 | 8/1985 | Japan . |
| 60-163015 | 8/1985 | Japan . |
| 61-4012 | 1/1986 | Japan . |
| 61-5222 | 1/1986 | Japan . |
| 62-31816 | 2/1987 | Japan . |
| 62-31817 | 2/1987 | Japan . |
| 62-34117 | 2/1987 | Japan . |
| 62-124011 | 6/1987 | Japan . |
| 62-153909 | 7/1987 | Japan . |
| 63-170247 | 7/1988 | Japan . |

Primary Examiner—Bruce Y. Arnold
Assistant Examiner—Rebecca D. Gass
Attorney, Agent, or Firm—Cushman, Darby & Cushman

[57] ABSTRACT

An objective lens system for microscopes comprising a plurality of lens units including a first lens unit arranged at the foremost location and having a positive refractive power, and using a GRIN lens or GRIN lenses designed taking into consideration the characteristic of the glass materials currently available. The objective lens system for microscopes consists of a small number of lens elements and has favorably corrected aberrations.

16 Claims, 6 Drawing Sheets

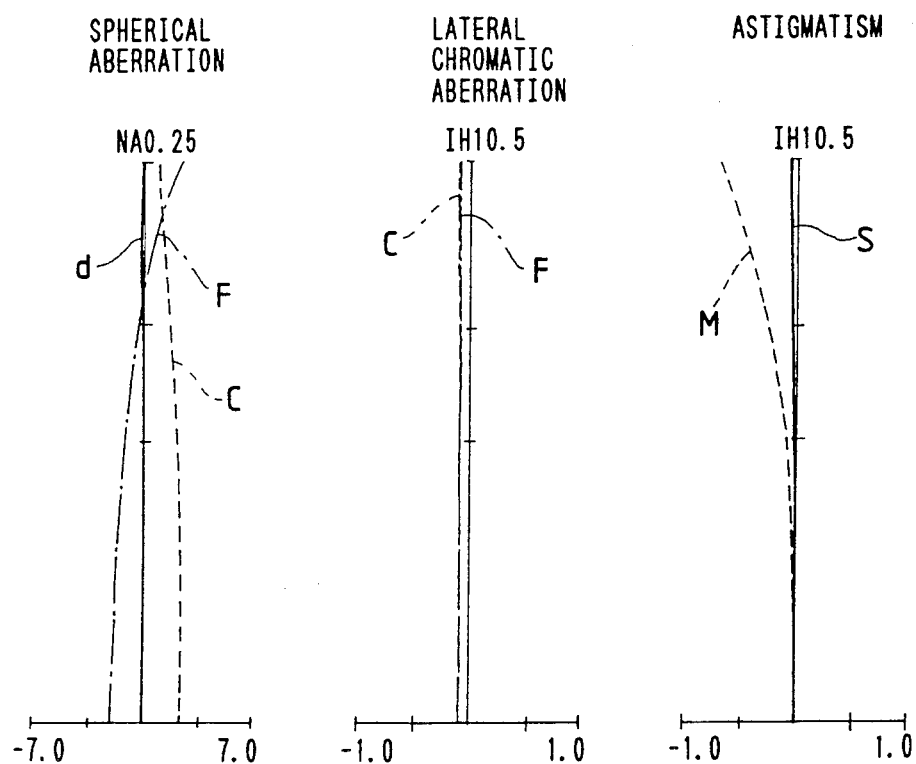
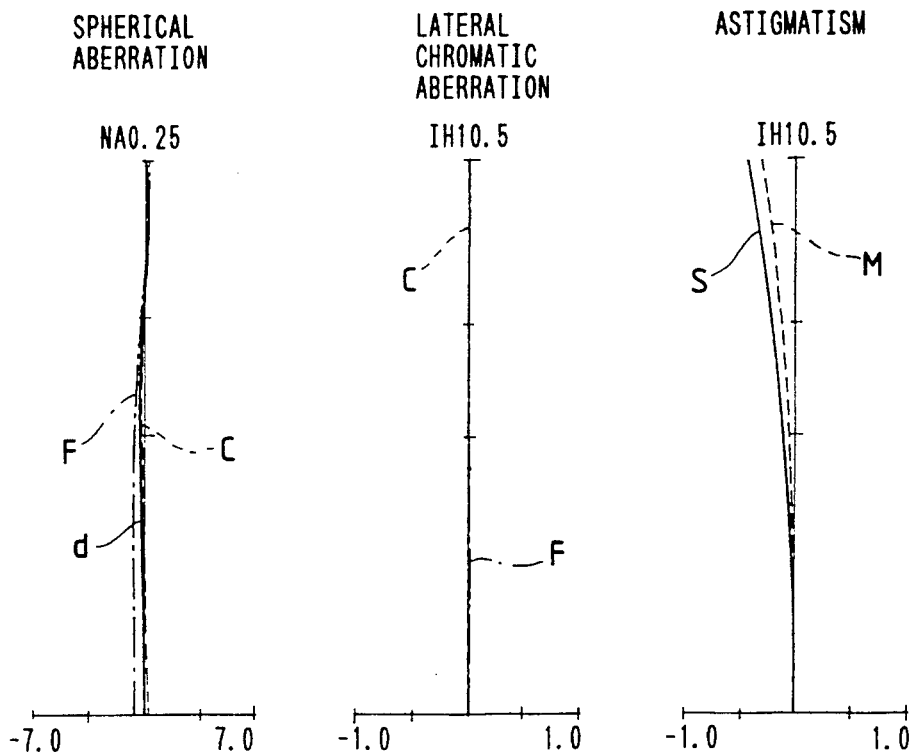

OBJECTIVE LENS SYSTEM FOR MICROSCOPES

BACKGROUND OF THE INVENTION a) Field of the Invention

The present invention relates to an objective lens system for microscopes which comprises a graded refractive index lens or such lenses having refractive index distribution in the direction perpendicular to the optical axis (radial GRIN lenses).

b) Description of the Prior Art

It is generally difficult in objective lens systems for microscopes to correct astigmatism and curvature of field with a small number of lens elements. When chromatic aberration is to be corrected additionally, refractive indices and Abbe's numbers of the glass materials to be used must be taken into consideration and therefore impose restrictions on the correction of the aberrations, thereby making it more difficult to correct the aberrations.

In order to realize an objective lens system for microscopes which satisfies the requirements such as working distance, numerical aperture, magnification etc., while overcoming the problems mentioned above, it was conventionally required to increase the number of lens elements composing the objective lens system.

In order to compose objective lens systems for microscopes wherein aberrations are favorably corrected with small numbers of lens elements, graded refractive index lenses (GRIN lenses) are used.

As the objective lens systems for microscopes using GRIN lenses, there are known the lens systems disclosed by Japanese Patents Kokai Publication No. Sho 62-31816, No. Sho 62-31817 and No. Sho 62-34117, etc. Further, as the publications containing descriptions on optical systems other than objective lens systems for microscopes and correction of aberrations, there are known Japanese Patents Kokai Publication No. Sho 60-159817, No. Sho 61-4012 and No. Sho 62-153909.

Out of these conventional examples, the lens systems disclosed by Japanese Patents Kokai Publication No. Sho 60-159817, No. Sho 61-5222 and No. Sho 62-153909 are photographic lens systems having corrected axial aberrations, offaxial aberrations, and chromatic aberration of the d-line and g-line. However, these publications contain no description on values of the terms of high orders $N_1$ and $N_2$ of the refractive index distribution coefficient of the GRIN lenses for the C-line and F-line in the numerical data related to chromatic aberration. Further, since these publications take no consideration on practical manufacturing circumstances of the glass materials, the GRIN lenses described therein have very low possibilities to be manufactured in practice.

Furthermore, the inventions disclosed by Japanese Patents Kokai Publication No. Sho 60-163015 and No. Sho 63-124011 have relations to GRIN lenses, but contains no descriptions on the offaxial aberrations, especially curvature of field.

Japanese Patent Kokai Publication No. Sho 62-34117 discloses an objective lens system for microscopes using GRIN lenses but takes no consideration on correction of chromatic aberration.

Japanese Patents Kokai Publication No. Sho 62-31816 and No. Sho 62-31817 disclose objective lens systems for microscopes which are of the type, similar to that of the objective lens system according to the present invention, and wherein not only the axial aberrations and offaxial aberrations but also chromatic aberrations of the C-line and F-line are corrected. For the GRIN lenses used in these objective lens systems, however, the characteristics of the glass materials currently available are not considered. Speaking concretely, the values of $\nu_{1d}$ determined from the distribution coefficient of the second order of the GRIN lenses are smaller than 0. Accordingly, these GRIN lenses have low possibilities to be manufactured in practice. The objective lens system disclosed by Japanese Patent Kokai Publication No. Sho 62-31816, for example, uses a GRIN lens in the first lens unit and selects $\nu_{1d} < 0$ for correction of chromatic aberration. Taking the characteristics of the glass materials currently available into consideration, the GRIN lens will have a low possibility to be manufactured unless $\nu_{1d}$ is larger than 0. $\nu_{1d}$ larger than 0 will make it impossible to correct chromatic aberration in this conventional example.

SUMMARY OF THE INVENTION

A primary object of the present invention is to provide an objective lens system for microscopes having the axial aberrations, offaxial aberrations and chromatic aberration which are corrected favorably by using a graded refractive index lens or such lenses (radial GRIN lenses) having refractive index distributions in the direction perpendicular to the optical axis.

The objective lens system for microscopes according to the present invention comprises a plurality of lens units including a first lens unit which is arranged at the foremost location and has a positive refractive power, and uses at least one radial GRIN lens in the lens system. This GRIN lens satisfies the following condition (1):

$$0 < \nu_{1d} \qquad (1)$$

$$\nu_{1d} = N_{1d}/(N_{1F} - N_{1C})$$

wherein the reference symbols $N_{1d}$, $N_{1C}$ and $N_{1F}$ represent the coefficients of the second order for the d-line, C-line and F-line expressed respectively by the following formulae (i):

$$n_d(r) = N_{0d} + N_{1d}r^2 + N_{2d}r^4 +$$

$$n_C(r) = N_{0C} + N_{1C}r^2 + N_{2C}r^4 + \qquad (i)$$

$$n_F(r) = N_{0F} + N_{1F}r^2 + N_{2F}r^4 +$$

When an objective lens system for microscopes consisting of a small number of lens elements is designed only with homogenous lens elements, the lens system has a positive focal length f and Petzval's sum thereof has a large positive value. In order to reduce the value of Petzval's sum, a positive lens component arranged in the first lens unit is designed as a meniscus lens component. However, the objective lens system for microscopes consisting of a small number of lens elements has low flexibility for correction of aberrations, and hardly permits reducing the Petzval's sum while correcting the axial aberrations and the offaxial aberrations.

Further, the objective lens system for microscopes cannot correct chromatic aberration without using a single or plural cemented doublets consisting of convex lens elements and a concave lens elements. Further, when the objective lens system for microscopes uses a single cemented doublet, only the lateral chromatic aberration or the longitudinal chromatic aberration is correctable in most cases. Even when an objective lens system for microscopes uses two or more cemented doublets, only the lateral chromatic aberration or the longitudinal chromatic aberration can be corrected in most cases where the objective lens system has a high magnification or high numerical aperture.

For the reason described above, it is difficult to compose an objective lens system for microscopes which has aberrations favorably corrected with a small number of lens elements.

Under this circumstance, there are reported objective lens systems for microscopes using GRIN lenses, but these GRIN lenses are designed without considering the glass materials currently available and can hardly be manufactured in practice.

The present invention has been made to compose an objective lens system for microscopes using a GRIN lens or GRIN lenses which have Abbe's numbers $\nu_{1d} > 0$ and can be manufactured easily.

When a numerical value representing a nature of a compound or a mixture is expressed as a total sum of amounts of the components thereof it is said that the nature is an additive property.

Examinations of optical properties of the elements composing glass materials clarify the distributions that the elements having high refractive indices on the $n_d - \nu_d$ graph have small Abbe's numbers, and vice versa.

Accordingly, in an attempt to manufacture a GRIN lens having a large difference in refractive index, Abbe's numbers are small at the portions having high refractive indices regardless of types of the elements selected for composing glass materials of forming gradients of densities. (See FIG. 13 and FIG. 14.)

As is disclosed by Japanese Patent Kokai Publication No. Sho 63-170247, it is possible to manufacture glass materials having Abbe's numbers which are not varied so remarkably, within a range where differences in refractive indices are not so high, by selecting adequate pairs of elements and performing ion-exchanges (the straight line B in FIG. 14).

The content of this paragraph is expressed by the following distribution coefficient of the first order:

$$0 < \nu_{1d}$$

$$\nu_{1d} = N_{1d}/(N_{1F} - N_{1C})$$

The above-mentioned condition represents the distribution tendency from the graded refractive index lens wherein Abbe's numbers are reduced as refractive indices of glass are enhanced (the straight line A in FIG. 14) to the graded refractive index lens wherein Abbe's numbers are slightly enlarged as refractive indices of glass is enhanced (the straight line B in FIG. 14).

The objective lens system for microscopes according to the present invention is designed with a GRIN lens or GRIN lenses satisfying the condition (1) which is the characteristic of the glass materials currently available.

Further, in order that the GRIN lens can easily be manufactured with the elements used in the glass materials currently available, it is desirable to satisfy the following condition (2):

$$\nu_{1d} \leq 100 \tag{2}$$

If the upper limit of the condition (2) is exceeded, the GRIN lens can hardly be manufactured with the elements used in the glass materials currently available.

The refractive index distribution in the radial GRIN lens having the refractive index distribution in the direction perpendicular to the optical axis which is used in the objective lens system according to the present invention is expressed by the following formula:

$$n(r) = N_0 + N_1 r^2 + N_2 r^4 + \ldots$$

wherein the reference symbol $N_0$ represents the refractive index on the optical axis, the reference symbol r designates the distance as measured from the optical axis in the direction perpendicular to the optical axis, the reference symbol n(r) denotes the refractive index as measured at a point located at the distance of r from the optical axis, and the reference symbols $N_1$, $N_2$, . . . represent the distribution coefficients of the second order, fourth order, . . .

The merit of a GRIN lens lies in the capability thereof to correct the aberrations produced by the lens surfaces in an optical system with the refractive index distribution of the medium thereof. Especially a radial GRIN lens is more excellent than a homogenous lens for corrections of Petzval's sum and longitudinal chromatic aberration.

Petzval's sum of a radial GRIN lens, when considered alone, is expressed by the following formula (ii):

$$PS = \phi_S/N_0 + \phi_M/N_0^2 \tag{ii}$$

wherein the reference symbol $\phi_S$ represents the refractive power of surface of a thin lens expressed by the following formula (iii) and the reference symbol $\phi_M$ designates the refractive power of medium expressed by the following formula (iv):

$$\phi_S = (N_0 - 1)/R_1 + (1 - N_0)/R_2 \tag{iii}$$

$$\phi_M = -2N_{1d} \tag{iv}$$

wherein the reference symbols $R_1$ and $R_2$ represent radii of curvature on the first surface and the second surface respectively of the lens, and the reference symbol d designates the thickness of the lens.

Since the radial GRIN lens is capable of correcting Petzval's sum by using the refractive index of medium as a variable as is known from the formula (ii), the radial GRIN lens has a capability to correct Petzval's sum which is higher than that of the homogenous lens.

Further, the formula for correcting chromatic aberration in the radial GRIN lens, when considered alone, is as follows:

$$PAC = \phi_S/\nu_{0d} + \phi_M/\nu_{1d} \tag{v}$$

wherein the reference symbol $\nu_{0d}$ represents the Abbe's number of the radial GRIN lens as measured on the optical axis and the reference symbol $\nu_{1d}$ designates the value determined by the distribution coefficient $N_1$ of the second order of the refractive index distribution formula as expressed below:

$$\nu_{1d} = N_{1d}/(N_{1F} - N_{1C})$$

wherein the reference symbol $N_{1d}$, $N_{1C}$ and $N_{1F}$ represent the distribution coefficient $N_1$ of the second order for the d-line, C-line and F-line respectively.

The homogenous lens, when used alone, cannot correct the longitudinal chromatic aberration. In contrast, the radial GRIN lens can correct the longitudinal chromatic aberration as expressed by the formula (v).

The objective lens system for microscopes according to the present invention comprises the first positive lens unit as already described above and is adapted so as to correct aberrations favorably with the GRIN lens satisfying the condition (1), i.e., having the characteristic of the glass materials currently available.

It is possible to correct aberrations in the objective lens system by using, in the first lens unit, a GRIN lens which has central thickness larger than the marginal thickness, a positive refractive power of medium, and such a shape and such a refractive index distribution as to make total refractive power positive. Petzval's sum can be reduced especially by designing the first lens unit as a lens component having a positive refractive power and a concave surface on the object side, and by selecting a small radius of curvature on said concave surface. Further it is possible to correct the aberrations produced in the first lens unit with the refractive index distribution of medium.

In most of the objective lens systems for microscopes composed only of homogenous lenses and having focal lengths of 7 mm and longer, the first lens unit has a positive refractive power, whereby the rear lens unit arranged on the image side of the first lens unit has relatively weakened refractive power of surface of reducing the aberrations to be produced by the surfaces and correcting the paraxial design values. Further, in order to correct Petzval's sum, the lens component arranged on the object side in the objective lens system is designed as a meniscus lens component having a concave surface on the object side, and the lens component arranged on the image side is designed as a meniscus lens component having a concave surface on the image side. Even when such a composition is selected, however, it is impossible to satisfy the paraxial design values and correct aberrations in the objective lens systems consisting only of homogenous lens elements unless the number of the lens elements is increased. By using a GRIN lens or GRIN lenses, on the other hand, it is possible to compose an objective lens system having favorably corrected aberrations of a small number of lens elements.

The present invention has made it possible to obtain the objective lens system having a Petzval's sum and other aberrations which are corrected with a GRIN lens or GRIN lenses having the characteristic of the glass materials currently available.

In the first place, description will be made on correction of Petzval's sum in an objective lens system consisting only of a single lens component.

When the refractive power of the surface of the first lens unit is represented by $\phi_{S1}$, and the refractive power of the medium thereof is designated by $\phi_{m1}$, $\phi_{S1}$ and $\phi_{M1}$ are in the relationship expressed by the formula (v). In order to reduce Petzval's sum, it is necessary to reduce the value of PS in the formula (ii). Assuming that PS=0, we obtain:

$$PS = \phi_{S1} N_{0d} + \phi_{M1} = 0$$

On an assumption that $1 < N_{0d} < 2$ on the basis of the refractive indices of the glass materials currently available, it is desirable for reducing Petzval's sum of the objective lens system consisting of a single lens component that $\phi_{S1}$ and $\phi_{M1}$ have the signs reverse to each other and satisfy the following relationship:

$$|\phi_{S1}| \leq |\phi_{M1}|$$

An objective lens system for microscopes is generally composed of plural lens units. Especially the first lens unit of the objective lens system has a strong refractive power and gives larger influence on aberrations than the other lens unit or units composing the objective lens system. Therefore, the means for correcting Petzval's sum of the objective lens system consisting only of a single lens component can exhibit the effect thereof when the means is applied to the first lens unit of the objective lens system composed of plural lens units. In other words, it is desirable in the objective lens system to use at least one GRIN lens in the first lens unit which gives a large influence on Petzval's sum and design the GRIN lens so as to satisfy the following condition:

$$|\phi_{S1}| \leq |\phi_{M1}|$$

When Petzval's sum is corrected as described above, flexibility for correcting the other aberrations is enhanced and aberrations can be favorably corrected with a small number of lens elements.

Especially by designing the GRIN lens arranged in the first lens unit of the objective lens system for microscopes so as to satisfy the following condition (3), it is possible to reduce Petzval's sum without aggravating the other aberrations:

$$0.1 > \phi_{S1} \tag{3}$$

If $\phi_{S1}$ does not satisfy this condition, it will be difficult to design an objective lens system having a small Petzval's sum and favorably corrected aberrations with a small number of lens elements.

When the condition (3) is satisfied, it is desirable for correcting aberrations that the GRIN lens arranged in the first lens unit, i.e., the GRIN lens which has the central thickness larger than the marginal thickness, a positive refractive power of medium and a positive total refractive power satisfies the following condition (4):

$$-10 \leq d_1^2 \times N_{1d} < -1 \times 10^{-5} \tag{4}$$

wherein the reference symbol $d_1$ represents central thickness of said GRIN lens.

If the first lens unit has a negative refractive power as a whole, the positive refractive power of the rear lens unit must be strengthened by reducing the radius of curvature on the convex surface thereof and aberrations will be aggravated.

If the value of $d_1^2 \times N_{1d}$ exceeds the lower limit of the condition (4), the refractive power of medium will substantially be the same as that of a homogenous lens element, thereby making it impossible to correct aberrations by the refractive index distribution. If the value of $d_1^2 \times N_{1d}$ exceeds the upper limit of the condition (4), in contrast, the refractive power will be varied due to the characteristic of the glass materials currently available and Abbe's number will also be varied so as to vary chromatic aberration, thereby making it difficult to favorably correct the chromatic aberration dependently on the height at which the axial ray passes.

Further, though the GRIN lens used in the objective lens systems according to the present invention has the characteristic of the glass materials currently available, aberrations can be corrected favorably also by using, in the first lens unit, the GRIN lens which has the central thickness larger than the marginal thickness, a negative refractive power of medium, and the shape and refractive index distribution giving a positive total refractive power. Especially by imparting a refractive index distribution to the first lens unit, the aberrations produced by the second surface thereof can be corrected by the reference index distribution.

In most of the objective lens systems for microscopes which have focal lengths of 30 mm or shorter and composed only of homogenous lens elements, the first lens unit has a positive refractive power for converging the rays from a specimen. Especially in the objective lens systems having short focal lengths, light bundle is largely refracted by the first lens unit to satisfy the paraxial design values. Though the spherical aberration, coma and so on which are produced by this refraction are corrected by using glass materials having high refractive indices and/or meniscus lens elements, there remain remarkable aberrations.

In contrast, use of a GRIN lens or GRIN lenses makes it possible to design an objective lens system for microscopes with a small number of lens elements.

In the objective lens system for microscopes according to the present invention, chromatic aberration and the other aberrations are corrected by using a GRIN lens or GRIN lenses which have the characteristics of the glass materials currently available.

As an example of the objective system for microscopes according to the present invention, a lens system comprising a GRIN lens having a negative refractive power of medium will be described below.

When the axial aberrations are to be corrected with a GRIN lens having the characteristic of the glass materials currently available $\phi_{S1}$ and $\phi_{M1}$ of the first lens unit are in the relationship expressed by the above-mentioned formula (v) and it is desirable for reducing the longitudinal chromatic aberration to reduce the value of the formula (v).

When an objective lens system consisting only of a single lens component is considered, it is sufficient for correcting the chromatic aberration to set the formula (v) as PAC=0, or transform it into the following formula (A):

$$PAC = \phi_S/\nu_{0d} + \phi_M/\nu_{1d} = 0 \tag{A}$$

This formula gives $\phi_M < 0$ for the GRIN lens which has the negative refractive power of medium as described above, whereas the characteristic of the glass materials currently available gives $\nu_{1d} > 0$. Further, since the Abbe's number $\nu_{0d}$ is larger than 0, the formula (A) gives $\phi_S$ expressed by the following formula (B):

$$\phi_S > 0 \tag{B}$$

Further, the following relationship applies to an objective lens system having a positive refractive power:

$$\phi_S + \phi_M > 0 \tag{C}$$

On the basis of $\phi_M < 0$, the formula (B) and the formula (C), the longitudinal chromatic aberration in the objective system consisting only of a single lens component can be corrected when the following relationship established between $\phi_S$ and $\phi_M$:

$$|\phi_S| > |\phi_M|$$

Practically, an objective lens system for microscopes is generally composed of a plurality of lens elements. Further, the first lens unit has an especially strong refractive power in the objective lens systems and gives influence on aberrations which is larger than those due to the other lens unit or units. Accordingly, it is possible to favorably correct the longitudinal chromatic aberration by designing a lens component having a strong positive refractive power in the first lens unit as a GRIN lens. That is to say, the negative refractive power of medium and the strong positive refractive power of the GRIN lens proper described above allow the following relations to be established:

$$\phi_{S1} > 0, \ \phi_{S1} + \phi_{M1} > 0$$

wherein the reference symbol $\phi_{S1}$ represents the refractive power of surface of the GRIN lens arranged in the first lens unit and the reference symbol $\phi_{M1}$ designates the refractive power of medium.

Hence, we obtain:

$$|\phi_{S1}| > \oplus \phi_{M1}|$$

This condition is the same as the above-mentioned condition for correcting the longitudinal chromatic aberration in the objective lens system consisting only of a single lens component. When this condition is satisfied, it is possible to correct the longitudinal chromatic aberration in the objective lens system consisting only of a single lens component, thereby making it possible to favorably correct the longitudinal chromatic aberration in the objective lens system consisting of a plurality of lens elements as a whole.

When the longitudinal chromatic aberration is corrected by the refractive powers including the refractive power of medium of the GRIN lens, flexibility for correcting the other aberrations is enhanced, thereby making it possible to obtain an objective lens system for microscopes having favorably corrected aberrations by using a small number of lens elements.

In this case, it is desirable that the GRIN lens arranged in the first lens unit has central thickness larger than the marginal thickness thereof, a negative refractive power of medium, a positive total refractive power and satisfies the following condition (5):

$$10 > d_1^2 \times N_{1d} > 1 \times 10^{-5} \tag{5}$$

wherein the reference symbol $d_1$ represents the central thickness of said GRIN lens.

If the upper limit of the condition (5) is exceeded, the refractive power of medium will be substantially the same as the refractive power of a homogenous lens element, thereby substantially zeroing the aberration correcting function of the refractive index distribution. If the lower limit of the condition (5) is exceeded, in contrast, both the refractive index and Abbe's number will be remarkably varied due to the characteristic of the glass materials currently available, and chromatic aberration will be varied dependently on the height of the axial ray passing through the GRIN lens, thereby making it difficult to correct the chromatic aberration. In the composition of the objective lens system for microscope described above, the aberrations which cannot be corrected with the first lens unit are to be corrected with the rear lens unit.

The foregoing description has been made on correction of Petzval's sum and the other aberrations in the objective lens system for microscopes by using the GRIN lens mainly in the first lens unit. However, a sufficient aberration correcting effect can be obtained by using a radial GRIN lens or GRIN lenses also in the rear lens unit which is arranged on the image side of the first lens unit. That is to say, the objective lens system for microscopes according to the present invention comprises at least one radial GRIN lens, or may comprise GRIN lenses in either or both of the first lens unit and the rear lens unit.

Further, the present invention, which limits the GRIN lenses to those which have the characteristic of the glass materials currently available, has succeeded in favorably correcting chromatic aberration by using at least one cemented doublet consisting of two radial GRIN lens elements. Furthermore, it is possible to correct not only the chromatic aberration but also the spherical aberration and the other aberrations by using at least two GRIN lens elements in a cemented doublet or doublets in the objective lens system.

Moreover, the objective lens system for microscopes must be designed so as to correct the longitudinal chromatic aberration and lateral chromatic aberration nearly to target values thereof. For this reason, it is desirable to correct the chromatic aberrations by using at least one achromatic cemented doublet in the rear lens unit.

One of the achromatic cemented doublets to be arranged in the objective lens system for microscopes according to the present invention should desirably satisfy the following condition (6):

$$\nu_{0p} > \nu_{0n} \tag{6}$$

wherein the reference symbol $\nu_{0p}$ represents the Abbe's number of a homogenous lens element which is arranged in the cemented doublet and has a shape thicker at the central portion than at the marginal portion thereof, and the reference symbol $\nu_{0n}$ designates the Abbe's number of the other homogenous lens which is arranged in the cemented double and has a shape thicker at the marginal portion than at the central portion thereof.

If the above-mentioned condition (6) is not satisfied, the cemented doublet will have a lowered function for correcting the chromatic aberration, thereby making it difficult to correct the chromatic aberration.

When it is desired to enhance the achromatic effect, it is sufficient to design at least one lens element arranged in the cemented doublet used in the rear lens unit as a GRIN lens. The achromatic effect can be enhanced especially by designing at least one of the lens elements arranged in the cemented doublet so as to have a shape thicker at the marginal portion that at the central portion thereof, refractive indices higher at the marginal portion and Abbe's numbers smaller at the marginal portion than that at the central portion thereof. When a GRIN lens element is used in the cemented doublet, it is also desirable to satisfy the above-mentioned condition (6). When the GRIN lens is used as described above, the reference symbols $\nu_{0p}$ and $\nu_{0n}$ used in the condition (6) represent Abbe's numbers as measured on the optical axis.

Moreover, it is desirable that the following condition (7) is satisfied by the GRIN lens element having the shape thicker at the marginal portion than at the central portion thereof:

$$10 > d^2 \times N_{1d} > 1 \times 10^{-5} \tag{7}$$

wherein the reference symbol d represents the thickness at the central portion of said GRIN lens element.

If the upper limit of the condition (7) is exceeded, the GRIN lens element will have a refractive power of medium substantially the same as that of a homogenous lens element and have nearly no aberration correcting function. If the lower limit of the condition (7) is exceeded, in contrast, Abbe's number will be varied remarkably along with the variation of refractive index due to the characteristic of the glass materials currently available and chromatic aberration will be varied dependently on height of the axial ray on the GRIN lens element, thereby making it difficult to correct the chromatic aberration.

In addition, the facts described above apply not only to a cemented doublet but also a cemented triplet.

BRIEF DESCRIPTION OF THE DRAWINGS

FIG. 7 through FIG. 12 show curves illustrating aberration characteristics of the Embodiments 1 through 6 of the present invention.

DETAILED DESCRIPTION OF THE PREFERRED EMBODIMENTS

Figure 1:
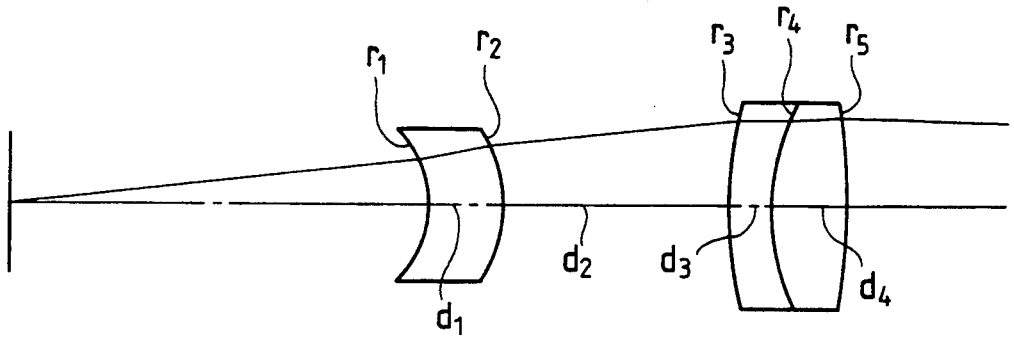
FIG. 1 through FIG. 6 show sectional views illustrating compositions of Embodiments 1 through 6 of the objective lens system for microscopes according to the present invention.

Now, the present invention will be described more detailedly with reference to the preferred Embodiments illustrated in the accompanying drawings and given in the form of the following numerical data:

| Embodiment 1 | | | |
|---|---|---|---|
| f = 29.286 | NA = 0.1 | PS = 0.1 | |
| WD = 19.9614 | $\phi_{S1}$ = −0.022 | $\phi_{M1}$ = 0.022 | |
| $r_1$ = −4.5984 | | | |
| $d_1$ = 3.4231 | $n_1$ = 1.5927 | $\nu_1$ = 35.29 | |
| $r_2$ = −6.3287 | | | |
| $d_2$ = 10.7682 | | | |
| $r_3$ = 19.2088 | | | |
| $d_3$ = 2.0566 | $n_2$ = GRIN lens 1 | | |
| ($d_3'$ = 2.3) | | | |
| $r_4$ = 13.3682 | | | |
| $d_4$ = 3.5 | $n_3$ = 1.48749 | $\nu_3$ = 70.15 | |
| $r_5$ = −27.645 | | | |

| GRIN lens 1 | | | |
|---|---|---|---|
| λ(nm) | $N_0$ | $N_1$ | $N_2$ |
| 587.56 | 1.80518 | 0.10248 × 10$^{-2}$ | 0.10456 × 10$^{-5}$ |
| 656.28 | 1.79610 | 0.10052 × 10$^{-2}$ | 0.10289 × 10$^{-5}$ |
| 486.13 | 1.82776 | 0.10735 × 10$^{-2}$ | 0.1087 × 10$^{-5}$ |
| $\nu_{0d}$ = 25.43 | | $\nu_{1d}$ = 15 | $\nu_{2d}$ = 18 |

| Embodiment 2 | | | |
|---|---|---|---|
| f = 29.967 | NA = 0.1 | PS = 0.378 | |
| WD = 17.8073 | $\phi_{S1}$ = −0.022 | $\phi_{M1}$ = 0.022 | |
| $r_1$ = −33.0727 | | | |
| $d_1$ = 5.8136 | $n_1$ = GRIN lens 2 | | |
| ($d_1'$ = 6) | | | |
| $r_2$ = INF | | | |
| $d_2$ = 9.9936 | | | |
| $r_3$ = −67.98 | | | |
| $d_3$ = 1.9875 | $n_2$ = 1.80518 | $\nu_2$ = 25.43 | |
| $r_4$ = 13.5593 | | | |

-continued

| | | |
|---|---|---|
| $d_4 = 6.2454$ | $n_3 = 1.7352$ | $\nu_3 = 41.08$ |
| $r_5 = -16.1102$ | | |

GRIN lens 2

| $\lambda$(nm) | $N_0$ | $N_1$ | $N_2$ |
|---|---|---|---|
| 587.56 | 1.74 | $-0.19192 \times 10^{-2}$ | $0.1696 \times 10^{-4}$ |
| 656.28 | 1.73244 | $-0.18927 \times 10^{-2}$ | $0.17051 \times 10^{-4}$ |
| 486.13 | 1.7586 | $-0.19809 \times 10^{-2}$ | $0.16749 \times 10^{-4}$ |
| $\nu_{0d} = 28.28746$ | | $\nu_{1d} = 21.766$ | $\nu_{2d} = 56.165$ |

Embodiment 3

| | | |
|---|---|---|
| $f = 15.611$ | $NA = 0.25$ | $PS = -0.01$ |
| $WD = 6.0001$ | $\phi_{S1} = 0.14$ | $\phi_{M1} = 0.026$ |
| $r_1 = 164.9729$ | | |
| $d_1 = 2$ | $n_1 =$ GRIN lens 3 | |
| $(d_1' = 1.5)$ | | |
| $r_2 = -5.8319$ | | |
| $d_2 = 1.5$ | | |
| $r_3 = -3.4704$ | | |
| $d_3 = 5.8617$ | $n_2 = 1.80518$ | $\nu_2 = 25.43$ |
| $r_4 = 44.4791$ | | |
| $d_4 = 4.0001$ | $n_3 =$ GRIN lens 4 | |
| $(d_4' = 2.4)$ | | |
| $r_5 = -8.5206$ | | |

| $\lambda$(nm) | $N_0$ | $N_1$ | $N_2$ |
|---|---|---|---|
| GRIN lens 3 | | | |
| 587.56 | 1.788 | $0.64891 \times 10^{-2}$ | $0.18619 \times 10^{-3}$ |
| 656.28 | 1.783 | $0.64457 \times 10^{-2}$ | $0.18495 \times 10^{-3}$ |
| 486.13 | 1.79963 | $0.65899 \times 10^{-2}$ | $0.18909 \times 10^{-3}$ |
| $\nu_{0d} = 47.38$ | | $\nu_{1d} = 45$ | $\nu_{2d} = 45$ |
| GRIN lens 4 | | | |
| 587.56 | 1.883 | $-0.13027 \times 10^{-2}$ | $0.32875 \times 10^{-7}$ |
| 656.28 | 1.87713 | $-0.12929 \times 10^{-2}$ | $0.32629 \times 10^{-7}$ |
| 486.13 | 1.89675 | $-0.13255 \times 10^{-2}$ | $0.33451 \times 10^{-7}$ |
| $\nu_{0d} = 45$ | | $\nu_{1d} = 40$ | $\nu_{2d} = 40$ |

Embodiment 4

| | | |
|---|---|---|
| $f = 16.023$ | $NA = 0.25$ | $PS = 0.143$ |
| $WD = 9.5993$ | $\phi_{S1} = -0.0158$ | $\phi_{M1} = 0.0963$ |
| $r_1 = 23.3339$ | | |
| $d_1 = 1.7126$ | $n_1 =$ GRIN lens 5 | |
| $(d_1' = 1.8)$ | | |
| $r_2 = 15.2662$ | | |
| $d_2 = 1.7439$ | | |
| $r_3 = -42.9737$ | | |
| $d_3 = 5.4068$ | $n_2 =$ GRIN lens 6 | |
| $(d_3' = 5.7)$ | | |
| $r_4 = 42.8566$ | | |
| $d_4 = 4.1415$ | $n_3 =$ GRIN lens 7 | |
| $r_5 = -27.6004$ | | |

| $\lambda$(nm) | $N_0$ | $N_1$ | $N_2$ |
|---|---|---|---|
| GRIN lens 5 | | | |
| 587.56 | 1.70622 | $-0.28115 \times 10^{-1}$ | $0.26878 \times 10^{-3}$ |
| 656.28 | 1.70269 | $-0.27972 \times 10^{-1}$ | $0.26742 \times 10^{-3}$ |
| 486.13 | 1.71446 | $-0.28448 \times 10^{-1}$ | $0.27197 \times 10^{-3}$ |
| $\nu_{0d} = 60$ | | $\nu_{1d} = 59$ | $\nu_{2d} = 59$ |
| GRIN lens 6 | | | |
| 587.56 | 1.7 | $0.144 \times 10^{-1}$ | $-0.1536 \times 10^{-3}$ |
| 656.28 | 1.693 | $0.14251 \times 10^{-1}$ | $-0.15201 \times 10^{-3}$ |
| 486.13 | 1.71633 | $0.14748 \times 10^{-1}$ | $-0.15731 \times 10^{-3}$ |
| $\nu_{0d} = 30$ | | $\nu_{1d} = 29$ | $\nu_{2d} = 29$ |
| GRIN lens 7 | | | |
| 587.56 | 1.87 | $-0.12918 \times 10^{-1}$ | $-0.57252 \times 10^{-4}$ |
| 656.28 | 1.8642 | $-0.1283 \times 10^{-1}$ | $-0.56862 \times 10^{-4}$ |
| 486.13 | 1.88353 | $-0.13124 \times 10^{-1}$ | $-0.58613 \times 10^{-4}$ |
| $\nu_{0d} = 45$ | | $\nu_{1d} = 44$ | $\nu_{2d} = 44$ |

Embodiment 5

| | | |
|---|---|---|
| $f = 8.819$ | $NA = 0.4$ | $PS = 0.607$ |
| $WD = 3$ | $\phi_{S1} = -0.06$ | $\phi_{M1} = 0.131$ |
| $r_1 = -10.6361$ | | |
| $d_1 = 1.5058$ | $n_1 =$ GRIN lens 8 | |
| $(d_1' = 1.7)$ | | |
| $r_2 = -48.7035$ | | |
| $d_2 = 4.7687$ | | |
| $r_3 = 68.8123$ | | |
| $d_3 = 2.8627$ | $n_2 =$ GRIN lens 9 | |
| $(d_3' = 1.6)$ | | |
| $r_4 = -6.5515$ | | |
| $d_4 = 0.15$ | | |
| $r_5 = -30.7883$ | | |
| $d_5 = 2$ | $n_3 = 1.7618$ | $\nu_3 = 27.11$ |
| $r_6 = 8.8827$ | | |
| $d_6 = 3$ | $n_4 = 1.6177$ | $\nu_4 = 51.24$ |
| $r_7 = -20.9310$ | | |

| $\lambda$(nm) | $N_0$ | $N_1$ | $N_2$ |
|---|---|---|---|
| GRIN lens 8 | | | |
| 587.56 | 1.816 | $-0.43625 \times 10^{-1}$ | $0.13974 \times 10^{-2}$ |
| 656.28 | 1.81075 | $-0.43334 \times 10^{-1}$ | $0.13881 \times 10^{-2}$ |
| 486.13 | 1.82825 | $-0.44304 \times 10^{-1}$ | $0.14191 \times 10^{-2}$ |
| $\nu_{0d} = 46.62$ | | $\nu_{1d} = 45$ | $\nu_{2d} = 45$ |
| GRIN lens 9 | | | |
| 587.56 | 1.51742 | $-0.25948 \times 10^{-2}$ | $-0.5216 \times 10^{-5}$ |
| 656.28 | 1.51444 | $-0.25792 \times 10^{-2}$ | $-0.51834 \times 10^{-5}$ |
| 486.13 | 1.52431 | $-0.26311 \times 10^{-2}$ | $-0.52921 \times 10^{-5}$ |
| $\nu_{0d} = 52.41$ | | $\nu_{1d} = 50$ | $\nu_{2d} = 48$ |

Embodiment 6

| | | |
|---|---|---|
| $f = 4.596$ | $NA = 0.65$ | $PS = 0.878$ |
| $WD = 0.7016$ | $\phi_{S1} = 0.128$ | $\phi_{M1} = -0.0199$ |
| $r_1 = -7.6376$ | | |
| $d_1 = 2.1513$ | $n_1 =$ GRIN lens 10 | |
| $(d_1' = 2)$ | | |
| $r_2 = -3.3315$ | | |
| $d_2 = 0.725$ | | |
| $r_3 = 23.0827$ | | |
| $d_3 = 2.9943$ | $n_2 =$ GRIN lens 11 | |
| $(d_3' = 2.2)$ | | |
| $r_4 = -4.7437$ | | |
| $d_4 = 0.9463$ | | |
| $r_5 = -234.636$ | | |
| $d_5 = 1.2666$ | $n_3 =$ GRIN lens 12 | |
| $(d_5' = 1.9)$ | | |
| $r_6 = 5.7185$ | | |
| $d_6 = 3.9688$ | $n_4 = 1.53997$ | $\nu_4 = 42.23$ |
| $r_7 = -7.5149$ | | |

| $\lambda$(nm) | $N_0$ | $N_1$ | $N_2$ |
|---|---|---|---|
| GRIN lens 10 | | | |
| 587.56 | 1.755 | $0.46164 \times 10^{-2}$ | $0.36539 \times 10^{-4}$ |
| 656.28 | 1.75063 | $0.45562 \times 10^{-2}$ | $0.36063 \times 10^{-4}$ |
| 486.13 | 1.76506 | $0.47569 \times 10^{-2}$ | $0.37651 \times 10^{-4}$ |
| $\nu_{0d} = 52.33$ | | $\nu_{1d} = 23$ | $\nu_{2d} = 23$ |
| GRIN lens 11 | | | |
| 587.56 | 1.497 | $-0.56749 \times 10^{-2}$ | $-0.1584 \times 10^{-4}$ |
| 656.28 | 1.49487 | $-0.56502 \times 10^{-2}$ | $-0.15772 \times 10^{-4}$ |
| 486.13 | 1.50197 | $-0.57324 \times 10^{-2}$ | $-0.16001 \times 10^{-4}$ |
| $\nu_{0d} = 70$ | | $\nu_{1d} = 69$ | $\nu_{2d} = 69$ |
| GRIN lens 12 | | | |
| 587.56 | 1.84666 | $0.84151 \times 10^{-3}$ | $-0.14864 \times 10^{-4}$ |
| 656.28 | 1.83649 | $0.83053 \times 10^{-3}$ | $-0.14670 \times 10^{-4}$ |
| 486.13 | 1.87216 | $0.86712 \times 10^{-3}$ | $-0.15317 \times 10^{-4}$ |
| $\nu_{0d} = 23.78$ | | $\nu_{1d} = 23$ | $\nu_{2d} = 23$ | wherein the reference symbol $r_1$, $r_2$, . . . represent the radii of curvature on the surfaces of the respective lens elements, the reference symbols $d_1$, $d_2$, . . . designate the thicknesses of the respective lens elements and the airspaces reserved therebetween, the reference symbols $n_1$, $n_2$, . . . denote the refractive indices of the respective lens elements, the reference symbols $\nu_0$, $\nu_1$, . . . represent the Abbe's numbers of the respective lens elements, the reference symbol f designates the focal length of the objective lens system as a whole, the reference symbol NA denotes the numerical aperture, the reference symbol PS represents the Petzval's sum, the reference symbol WD designates the working distance, the reference symbol $\phi_S$ denotes the refractive power of the single lens component arranged in the first lens unit, the reference symbol $\phi_M$ represents the refractive power of medium of the single lens component arranged in the first lens unit, and the reference symbols $d_1'$, $d_2'$ and $d_3'$ designate thicknesses at the marginal portions of the GRIN lens element.

The Embodiment 1 is designed as an objective lens system for microscopes which has a relatively long focal length. In the Embodiment 1, a GRIN lens element having the characteristic of the glass materials currently available is used in the second lens unit which is adopted as the rear lens unit. $v_{1d}$ which is determined by the coefficient $N_1$ of the second order of the refractive index distribution formula for the d-line, C-line and F-line satisfies the condition (1).

The Embodiment 1 is of a lens type wherein the first lens unit is designed as a single meniscus lens element so as to have a Petzval's sum of nearly 0 and the second lens unit is designed as a cemented doublet for correcting chromatic aberration.

When an objective lens system of this type is composed only of homogenous lens elements, it will be difficult to reduce spherical aberration, coma, astigmatism, curvature of field, chromatic aberration and so on.

In contrast, use of a GRIN lens element, as in the case of the Embodiment 1 of the present invention, makes it possible to correct the aberrations to the levels similar to those in a planar objective lens system and reduce Petzval's sum.

The Embodiment 1 corrects, by using the GRIN lens element in the second lens unit as described above, the aberrations which cannot be corrected only with homogenous lens elements. Speaking more concretely, the second lens unit is designed as the cemented doublet comprising a negative lens element which is designed as a GRIN lens element as shown in FIG. 1. By designing the second lens unit as the cemented doublet and using the GRIN lens element therein, chromatic aberration is corrected sufficiently favorably. The Abbe's number of the lens element having the shape thicker at the central portion than at the marginal portion thereof and the Abbe's number of the GRIN lens element having the shape thicker at the marginal portion than at the central portion thereof satisfy the condition (6), i.e., $v_{0p} > v_{0n}$.

In order to correct the chromatic aberration more sufficiently, it is desirable to design the second lens unit so as to satisfy the following condition:

$$v_{0p} - v_{0n} > 10$$

If this condition is not satisfied, the effect to correct the chromatic aberration is lowered, thereby making it impossible to correct the chromatic aberration sufficiently in the objective lens system.

Further, when the objective lens system comprises at least one cemented doublet, it is desirable that the lens element which is arranged in the cemented doublet and has the shape thicker at the marginal portion than at the central portion thereof is designed as a GRIN lens element satisfying the following condition:

$$v_{0d} \geqq v_{1d}$$

If this condition is not satisfied, the chromatic aberration will be corrected at a lower degree by the cemented doublet and must be corrected by the other lenses. In the Embodiment 1, the lens element arranged on the object side in the second lens unit satisfies the above-mentioned condition.

Figure 2:
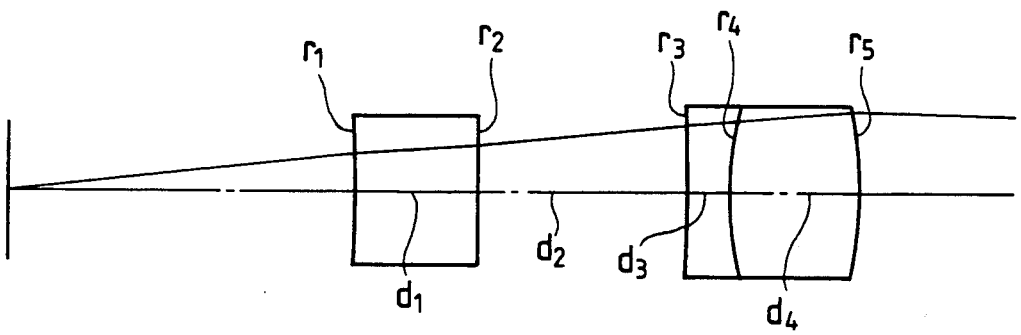

The Embodiment 2 is characterized in that it is composed of lens components each of which has a planar surface or surfaces on one or both the sides thereof as shown in FIG. 2. The Embodiment 2 is designed as an objective lens system wherein the first lens unit consists of a single GRIN lens element having refractive index distribution in the direction perpendicular to the optical axis for favorably correcting aberrations.

Further, the Embodiment 2 is designed taking manufacturability of the GRIN lens element into consideration. If the GRIN lens element having the refractive index distribution in the direction perpendicular to the optical axis has curved surfaces, it will be necessary to align the centers of curvature on the curved surfaces with the axis of the refractive index distribution. However, this alignment is very difficult. In the Embodiment 2, one of the surfaces of the GRIN lens element is designed as the planar surface for facilitating the alignment between the center of the surface and the axis of the refractive index distribution.

In spite of the restriction imposed by the shape of the GRIN lens element, the Embodiment 2 has a Petzval's sum smaller than an objective lens system which is of the same type and composed only of homogenous lens elements, and has optical performance equalled to that of a planar objective lens system.

A favorable objective lens system can be obtained also by designing both the surfaces of the GRIN lens element as planar surfaces. In this case, the GRIN lens element will be manufactured more easily.

Figure 3:
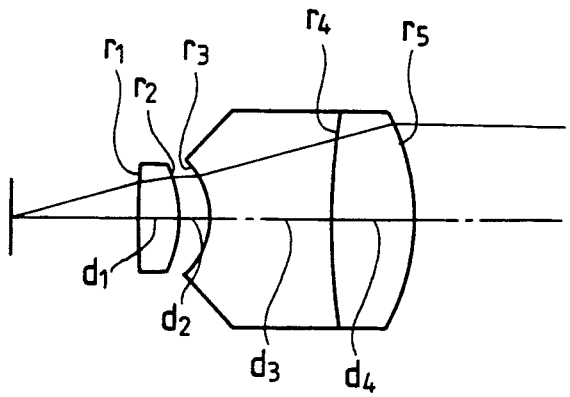
Figure 4:
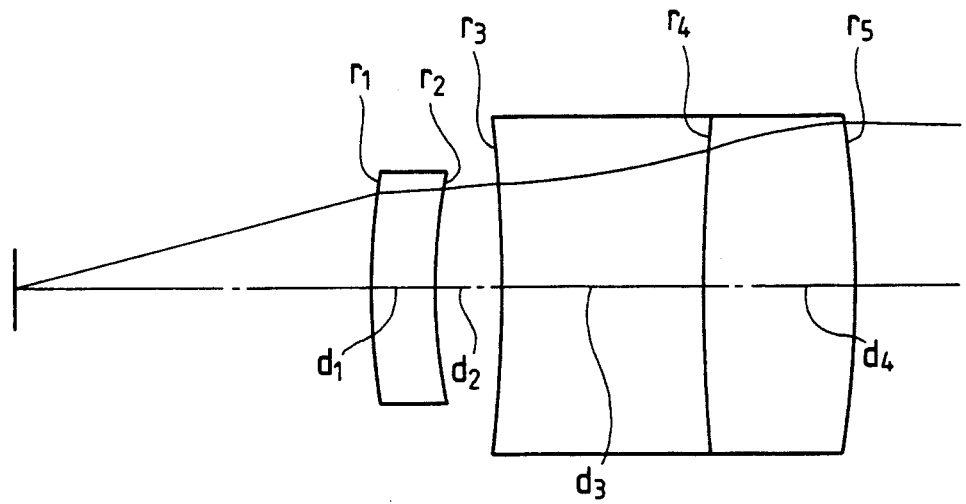

The Embodiment 3 is designed as an objective lens system which has a focal length shorter than that of the Embodiment 1. The Embodiment 3 consists, as shown in FIG. 3, of a first lens unit composed of a positive lens component, and a second lens unit or a rear lens unit which is composed of a cemented meniscus lens component having a small radius of curvature on the object side surface. The Petzval's sum of the Embodiment 3 is reduced by selecting the small radius of curvature on the side of the second lens unit and chromatic aberration is corrected favorably by designing the second lens unit as the cemented doublet.

If an objective lens system of the type of the Embodiment 3 is composed only of homogenous lens elements, spherical aberration and coma will be produced by the object side surface of the second lens unit which has the small radius of curvature, thereby making it impossible to correct aberrations favorably. By using a GRIN lens element as in the case of the Embodiment 3, however, it is possible to obtain an objective lens system having favorable optical performance.

In the Embodiment 3, GRIN lens elements are used in both the first lens unit and the second lens unit. The GRIN lens element used in the first lens unit functions mainly for correcting spherical aberration, coma and astigmatism. The GRIN lens element used in the second lens unit functions mainly for correcting longitudinal chromatic aberration, spherical aberration and coma.

By using a single GRIN lens element in the Embodiment 3, it is also possible to obtain an objective lens system which has optical performance more excellent than that of an objective lens system composed only of homogenous lens elements.

The Embodiment 4 is an objective lens system which uses a cemented doublet consisting of two GRIN lens elements. Speaking more concretely, a cemented doublet consisting of two GRIN lens elements is used as the second lens unit for favorably correcting the longitudinal chromatic aberration and lateral chromatic aberration. If an objective lens system of the type of the Embodiment 4 is composed only of homogenous lens elements, radii of curvature will be reduced on the lens surfaces to enlarge the Petzval's sum, thereby aggravating the offaxial aberrations in the objective lens system. In the Embodiment 4, in contrast, aberrations are favorably corrected by using the GRIN lens elements so as to enlarge the radii of curvature on the surfaces which would otherwise produce remarkable aberrations. Further, gradients of refractive index distributions of medium are enhanced to reduce the Petzval's sum.

In the Embodiment 4, spherical aberration, coma and astigmatism are corrected by the GRIN lens component used as the first lens unit. Further, the longitudinal chromatic aberration, in addition to the above-mentioned aberrations, is corrected by the two GRIN lens elements arranged in the cemented doublet used as the second lens unit.

Figure 5:
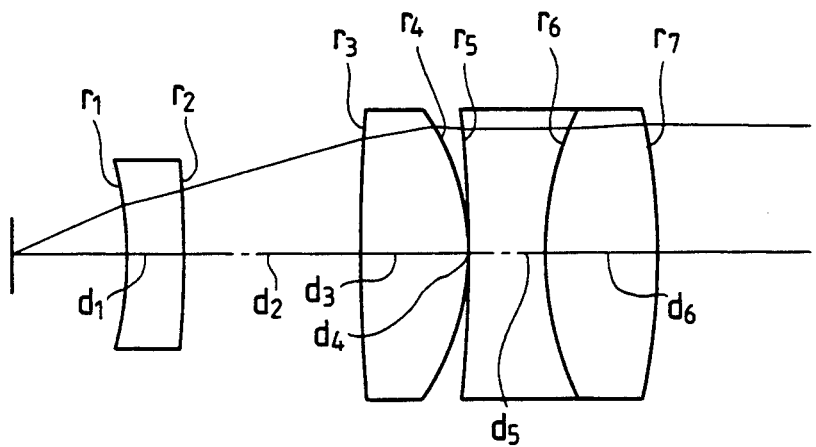

The Embodiment 5 has the composition illustrated in FIG. 5 and designed as an objective lens system which has a focal length shorter than that of the Embodiment 4. In the Embodiment 5, aberrations are corrected more favorably than those in an objective lens system composed only of homogenous lens elements. Speaking concretely, a GRIN lens component is used as the first lens unit for reducing the Petzval's sum and correcting coma sufficiently favorably. Further, spherical aberration and longitudinal chromatic aberration are corrected favorably by the second lens unit.

Figure 6:
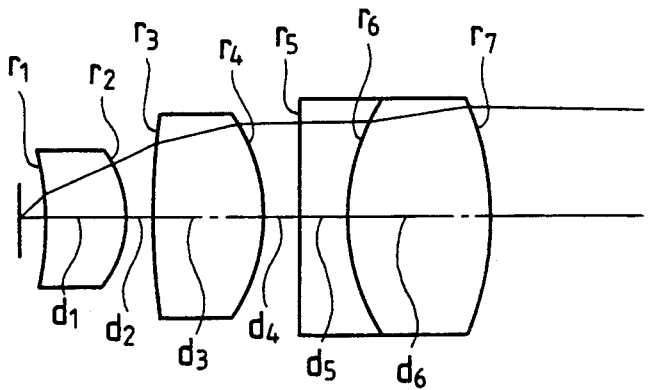
Figure 7:
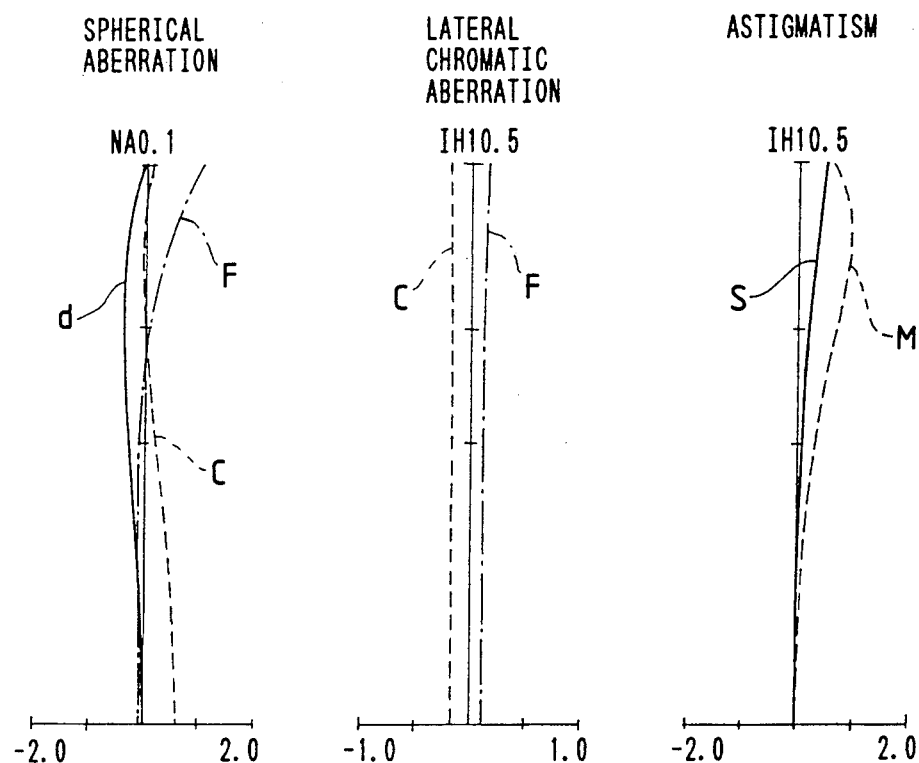
Figure 8:
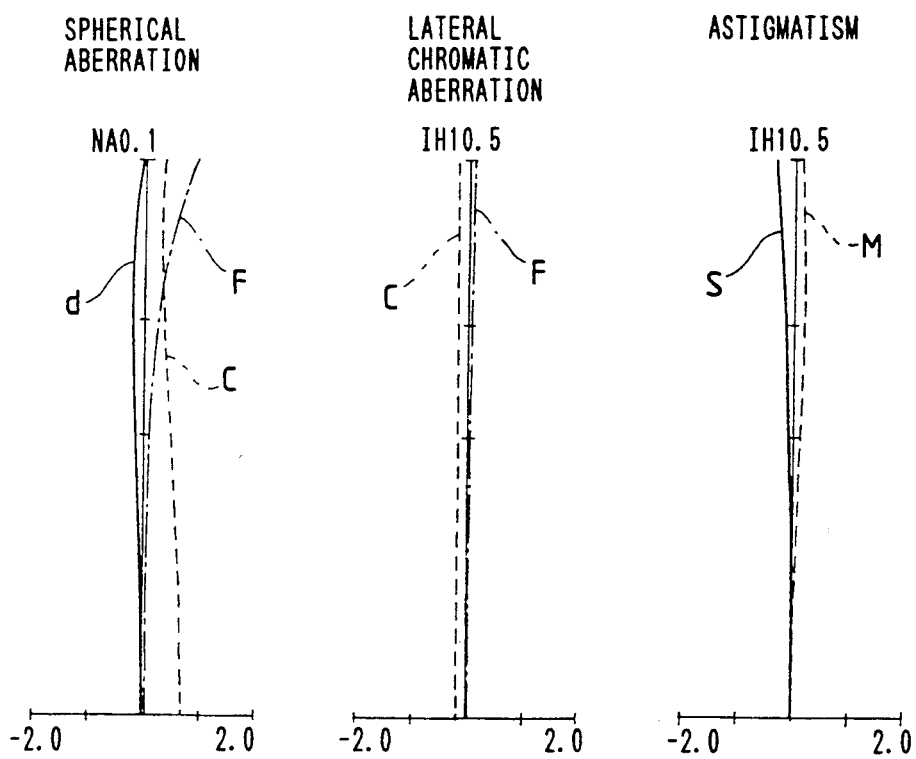
Figure 11:
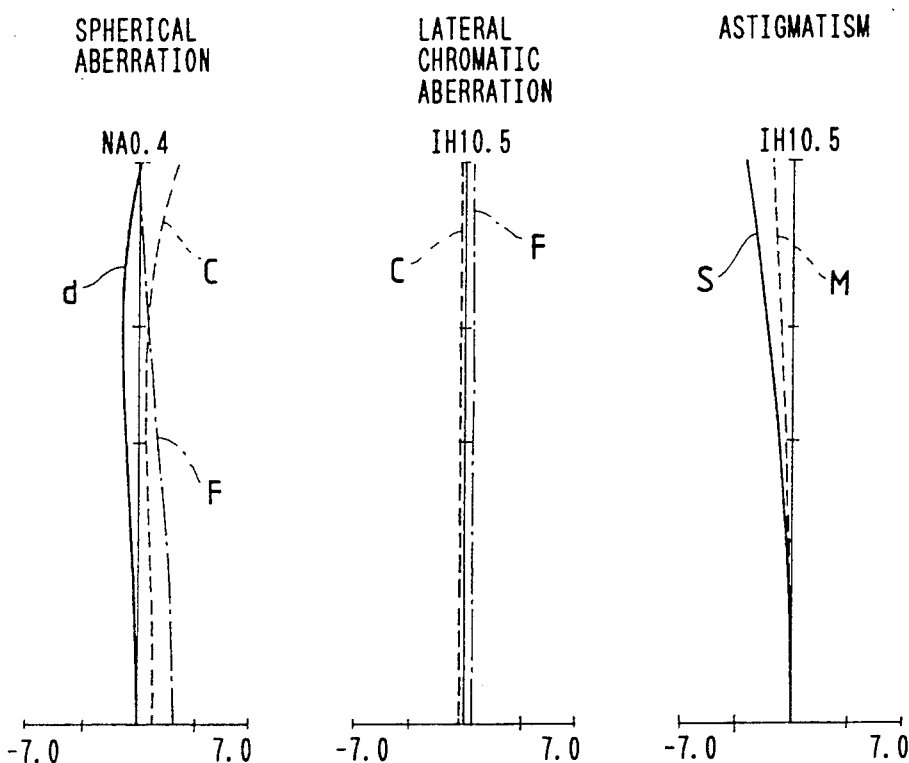
Figure 12:
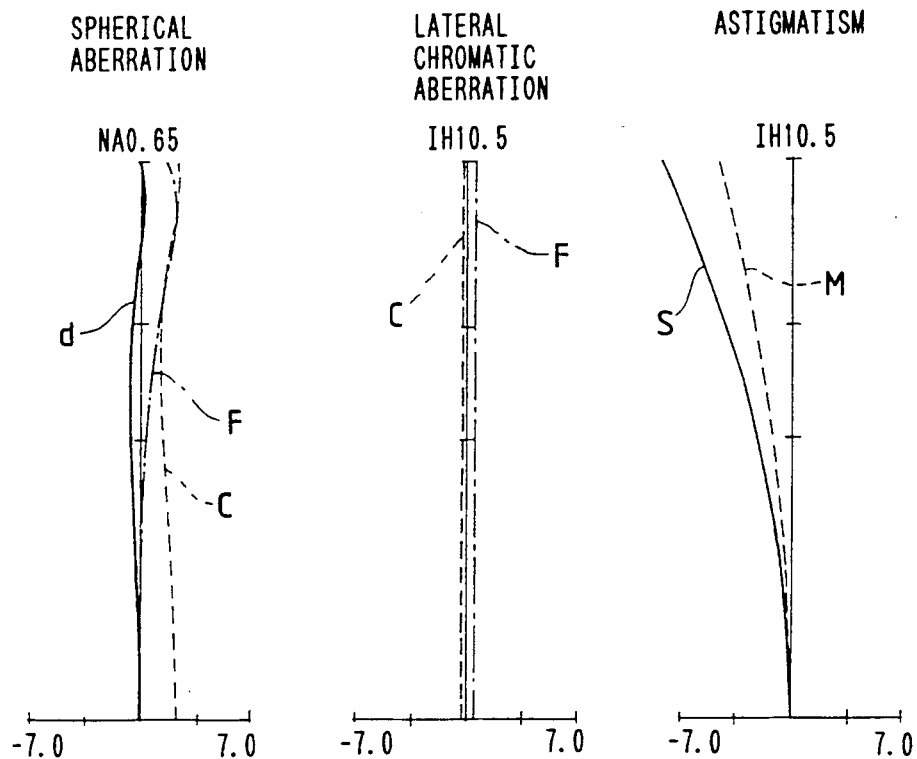
Figure 13:
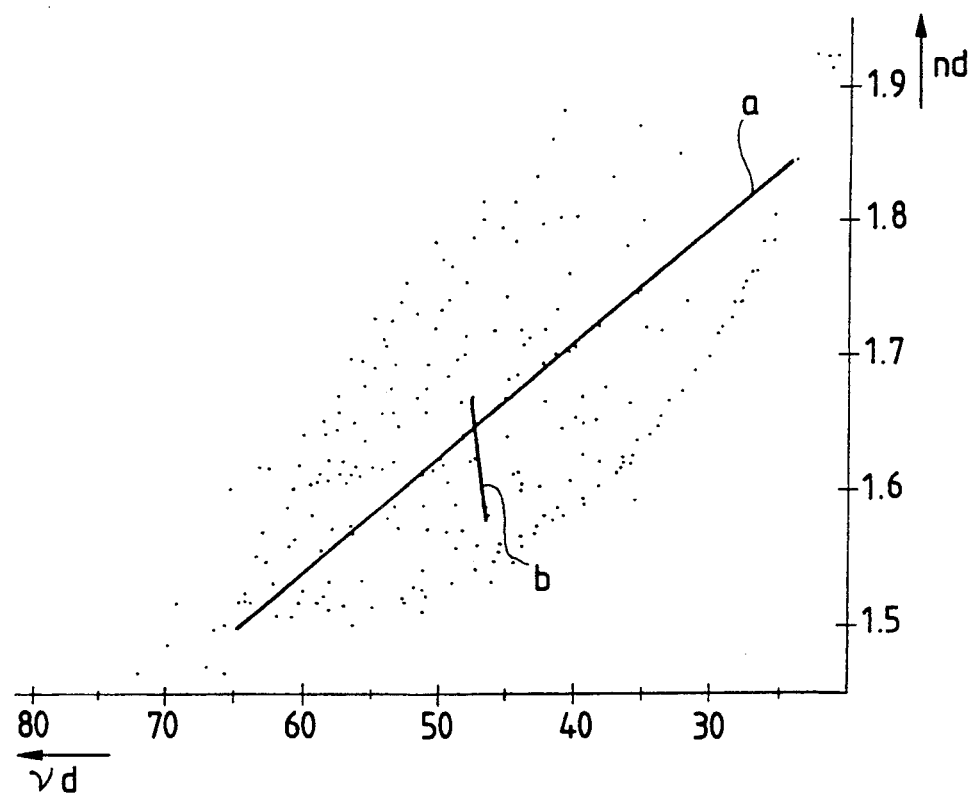
FIG. 13 and FIG. 14 show graphs illustrating relationship between refractive index $n_d$ and Abbe's number $\nu_d$.
Figure 14:
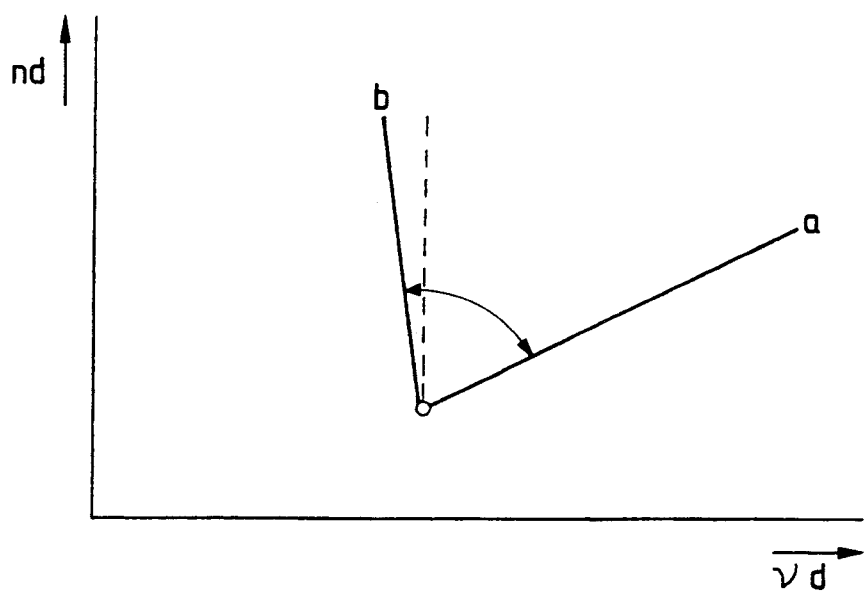

The Embodiment 6 has the composition illustrated in FIG. 6, and is designed as an objective lens system which has a focal length shorter than that of the Embodiment 5 and favorably corrects spherical aberration especially.

As is understood from the foregoing description, the present invention provides an objective lens system for microscopes which uses a radial GRIN lens or GRIN lenses having the characteristic of the glass materials currently available, a simple composition, and favorably corrected axial aberrations, offaxial aberrations and chromatic aberration.

I claim:

1. An objective lens system for microscopes comprising a plurality of lens units including a first lens unit arranged at the foremost location and having a positive refractive power, and using at least one radial GRIN lens satisfying the following condition (1):

$$0 < v_{1d} \quad (1)$$

wherein the reference symbol $v_{1d} = N_{1d}/(N_{1F} - N_{1C})$, $N_{1d}$, $N_{1F}$ and $N_{1C}$ being the coefficients of the second order of the refractive index distribution formula for the d-line, F-line and C-line respectively shown below:

$$n_d(r) = N_{0d} + N_{1d}r^2 + N_{2d}r^4 + $$

$$n_C(r) = N_{0C} + N_{1C}r^2 + N_{2C}r^4 + $$

$$n_F(r) = N_{0F} + N_{1F}r^2 + N_{2F}r^4 + $$

2. An objective lens system for microscopes according to claim 1 satisfying the following condition (2):

$$v_{1d} \leq 100 \quad (2)$$

3. An objective lens system for microscopes according to claim 1 or 2 comprising a radial GRIN lens in said first lens unit.

4. An objective lens system for microscopes according to claim 3 wherein said GRIN lens has a shape thicker at the marginal portion than at the central portion thereof, a positive refractive power of medium and a positive total refractive power.

5. An objective lens system for microscopes according to claim 4 wherein $\phi_{S1}$ and $\phi_{M1}$ have signs reverse to each other and satisfy the following condition:

$$|\phi_{S1}| \leq |\phi_{M1}|$$

wherein the reference symbol $\phi_{S1}$ represents the refractive power of surface of said GRIN lens and the reference symbol $\phi_{M1}$ designates the refractive power of medium of said GRIN lens.

6. An objective lens system for microscopes according to claim 5 wherein said GRIN lens satisfies the following condition (3):

$$0.1 > \phi_{S1} \quad (3)$$

7. An objective lens system for microscopes according to claim 6 wherein said GRIN lens satisfies the following condition (4):

$$-10 < d_1^2 \times N_{1d} < -1 \times 10^{-5} \quad (4)$$

wherein the reference symbol $d_1$ represents the thickness of said GRIN lens as measured at the central portion thereof and the reference symbol $N_{1d}$ designates the refractive index distribution coefficient of the second order for said GRIN lens.

8. An objective lens system for microscopes according to claim 3 wherein said GRIN lens has a shape thicker at the central portion than at the marginal portion thereof, a negative refractive power of medium and a positive total refractive power.

9. An objective lens system for microscopes according to claim 8 wherein said GRIN lens satisfies the following condition:

$$|\phi_{S1}| > |\phi_{M1}|$$

wherein the reference symbol $\phi_{S1}$ represents the refractive power of surface of said GRIN lens and the reference symbol $\phi_{M1}$ designates the refractive power of medium of said GRIN lens.

10. An objective lens system for microscopes according to claim 9 wherein said GRIN lens satisfies the following condition (5):

$$10 > d_1^2 \times N_{1d} > 1 \times 10^{-5} \quad (5)$$

wherein the reference symbol $d_1$ represents the thickness of said GRIN lens as measured at the central portion thereof and the reference symbol $N_{1d}$ designates the refractive index distribution coefficient of the second order for said GRIN lens.

11. An objective lens system for microscopes according to claim 1 comprising the first lens unit and a second lens unit.

12. An objective lens system for microscopes according to claim 11 wherein said second lens unit comprises a cemented doublet and satisfies the following condition (6):

$$v_{0p} > v_{0n} \quad (6)$$

wherein the reference symbol $v_{0p}$ represents the Abbe's number of a lens element arranged in said cemented doublet and having a shape thicker at the central portion than at the marginal portion thereof, and the reference symbol $\nu_{0n}$ designates the Abbe's number of a lens element arranged in said cemented doublet and has a shape thicker at the marginal portion than at the central portion thereof.

13. An objective lens system for microscopes according to claim 12 wherein said second lens unit comprises a GRIN lens satisfying the following condition (7):

$$10 > d^2 \times N_{1d} > 1 \times 10^{-5} \tag{7}$$

wherein the reference symbol d represents the thickness as measured at the central portion of the GRIN lens arranged in said second lens unit and the reference symbol $N_{1d}$ designates the refractive index distribution coefficient of the second order for the GRIN lens arranged in said second lens unit.

14. An objective lens system for microscopes according to claim 12 wherein one of the lens elements composing said cemented doublet is designed as a GRIN lens element.

15. An objective lens system for microscopes according to claim 12 wherein both the lens elements composing said cemented doublet are designed as GRIN lens elements.

16. An objective lens system for microscopes according to claim 11 wherein said second lens unit is designed as a GRIN lens component.

* * * * *